United States Patent [19]

Carrer

[11] 3,882,560
[45] May 13, 1975

[54] COMBINED MULTI-PURPOSE IMPLEMENTS

[76] Inventor: Valentina Carrer, 10, Via Monte Focobon, Mestre-Favaro, Italy

[22] Filed: Apr. 4, 1973

[21] Appl. No.: 347,641

[52] U.S. Cl.................. 7/8.1 R; 7/13 B; 7/14.55
[51] Int. Cl.............................................. B25f 1/02
[58] Field of Search ........ 7/13 B, 1 R, 8.1 R, 14.55, 7/1 L, 13 B

[56] References Cited
UNITED STATES PATENTS
806,515  12/1905  Baumgartner........................ 7/13 B
3,038,177  6/1962  Machtle............................... 7/13 B FOREIGN PATENTS OR APPLICATIONS
47,836  5/1911  Austria................................. 7/13 B
958,291  9/1949  France................................. 7/13 B

*Primary Examiner*—Al Lawrence Smith
*Assistant Examiner*—Roscoe V. Parker
*Attorney, Agent, or Firm*—Larson, Taylor & Hinds

[57] ABSTRACT

A multi-purpose implement adapted to be housed and carried in a flat and compact case occupying a very small space, and to provide a set of hitting, striking, cutting, sawing, digging, gathering and other implements.

6 Claims, 8 Drawing Figures

PATENTED MAY 13 1975

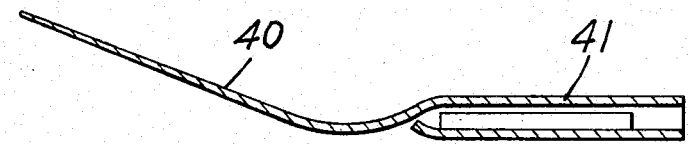
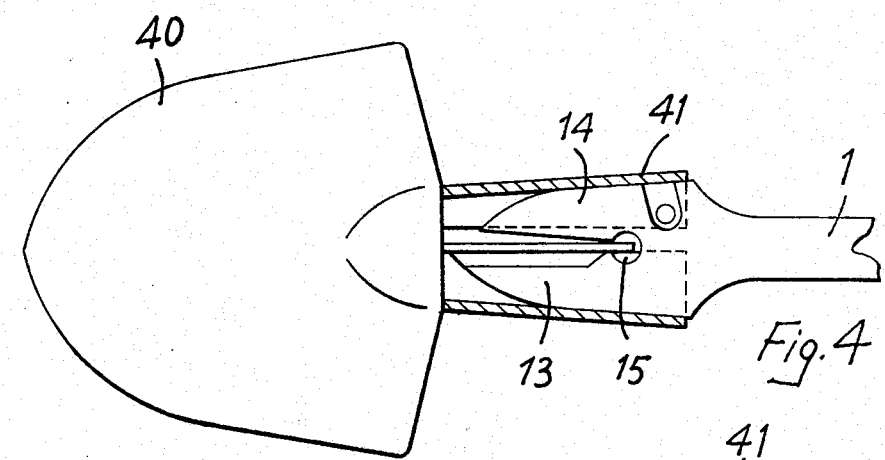
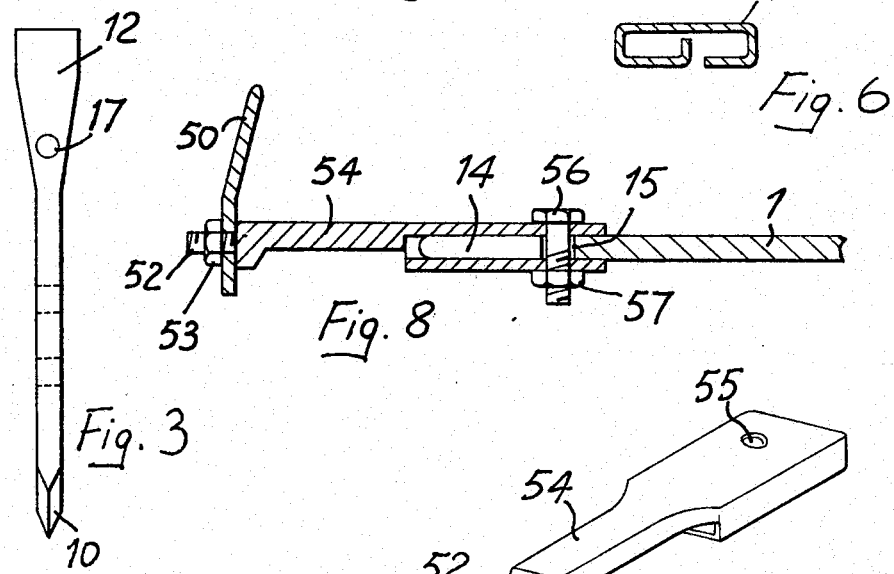
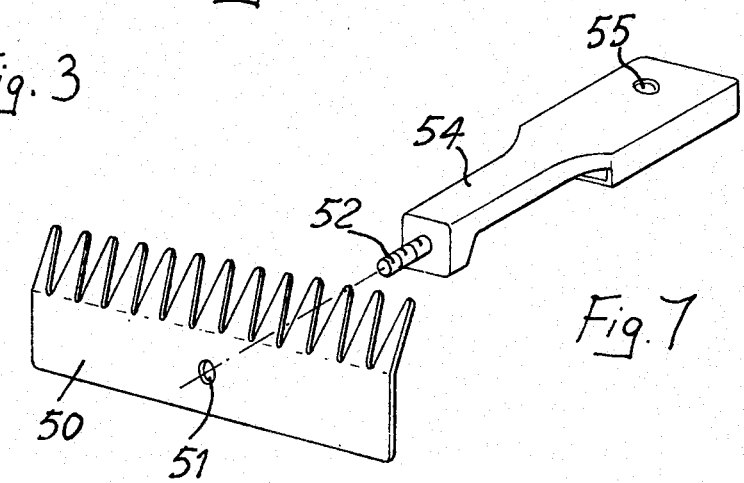

3,882,560

COMBINED MULTI-PURPOSE IMPLEMENTS

BACKGROUND AND SUMMARY OF THE INVENTION

This invention relates to a multi-purpose implement adapted to be housed and carried in a flat and compact case occupying a very small space, for example, in a car, and to provide a set of hitting, striking, cutting, sawing, digging, gathering and other implements adapted to be used especially in emergency operations, such as may be required in camping activities, automobile accidents or like situations.

According to the invention, the combined multi-purpose implement comprises a basic member and complementary implement parts capable of being fitted thereto, wherein the basic member is substantially T-shaped, with the cross-piece of the T forming a head part, shaped to serve as, or to carry, striking or hitting implement parts, while the end of the longitudinal shank of the T remote from the head is shaped to serve as, and or to carry, implement parts operable by displacement of said shank.

The remote end of the shank may be formed as a sheet metal cutter, of the kind resembling a large double-jaw single fixed blade can opener, and/or may carry other implement parts. The multi-purpose implement is used by angularly swinging or rocking said shank, and/or by punching or pulling said shank, so that the shank is employed as a lever or shaft.

According to one preferred embodiment of the invention, the shank is provided with notches or other means for fastening an anchoring member so as to project substantially transversely of the shank and generally parallel to one of the limbs of the head, the anchoring member, when so fastened, being cooperable with anchoring and tensioning means, fastened to a limb of the head, to tension a flexible blade, such as a saw blade.

According to one preferred embodiment of the invention, the implement parts carried by the remote end or foot of the shank may be implement parts to be used by pushing the shank axially to insert the part into a material for example, when the part comprises the blade of a space of shovel, or to be used by pulling when the implement part is digging or a gathering implement, such as a rake.

BRIEF DESCRIPTION OF THE DRAWINGS

In order that the invention may be more readily understood, a preferred embodiment thereof will now be described with reference to the accompanying drawings, in which:

FIG. 3 is an end view of the basic member, drawn on line III—III in FIG. 1;

FIG. 4 is a plan view, partly in section, of an implement part comprising a space head fitted to the free end or foot of the shank of the T;

FIG. 5 is a longtudinal section through the spade head shown in FIG. 4;

FIG. 6 is a cross-section through the neck of the space head;

FIG. 7 is a perspective view of a rake neck or handle and a rake to be fitted thereon, and FIG. 8 is a longitudinal section through the rake shown in FIG. 7 fastened to the foot of the shank.

DESCRIPTION OF A PREFERRED EMBODIMENT OF THE INVENTION

Figure 1:
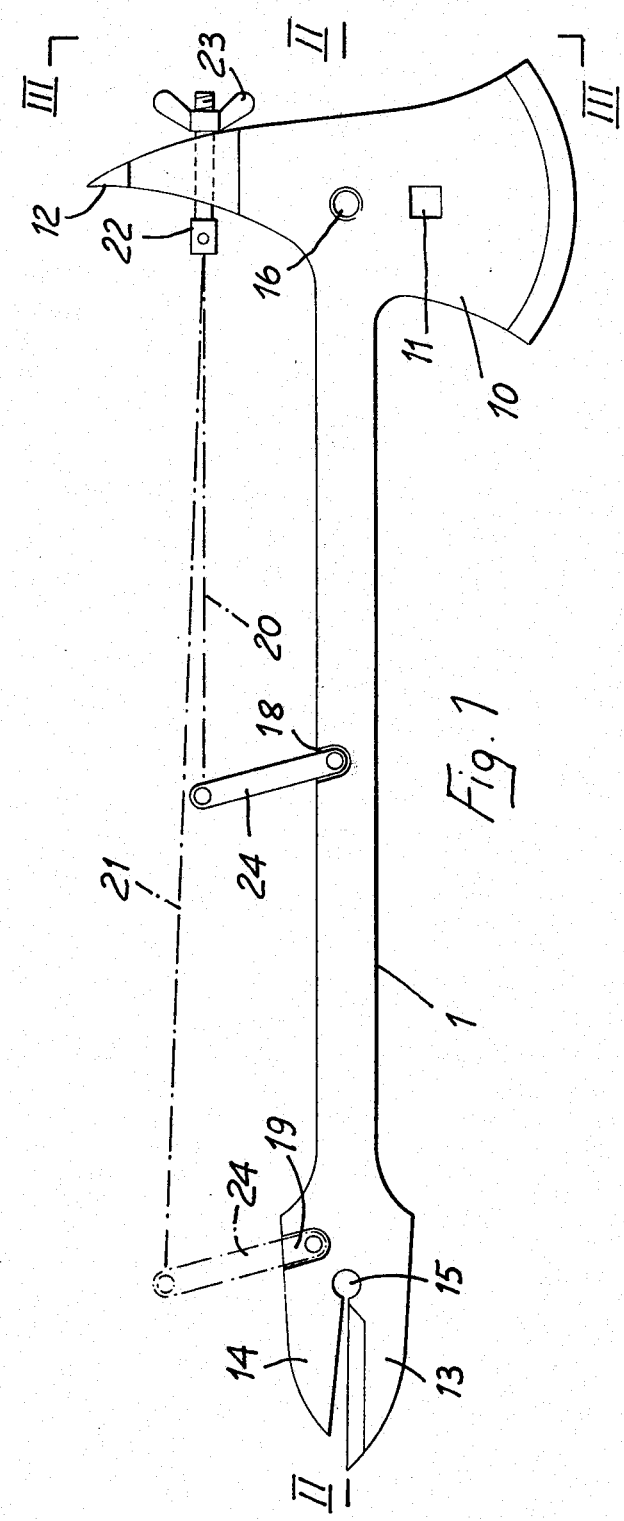
FIG. 1 is a side view of a substantially T-shaped basic member of a multi-purpose implement; also showing the manner in which one or more other of two band saw blades may be anchored.

With reference to FIG. 1 of the drawings, 1 denotes the shaft or shank of a substantially T-shaped basic member, for example a metallic member, forming a common part of a number of different implements. Integral with one end of this shaft 1 in a cross piece of the T forming the head of the basic member. One limb of this head is shaped to form a slender pick-axe part 12, which is also adapted to be grasped and used as a handle for a saw when a saw blade is anchored thereto as will be described hereinafter. The other limb of the head is shaped to form a hatchet part 10.

At the opposite end of the shaft is provided a sheet metal shearing cutter, comprising a cutter blade 13 and a counter lever jaw or anvil 14 disposed at an angle to the blade 13. At the juncture of the fixed blade 13 and lever jaw 14 is an enlarged opening 15.

Figure 2:
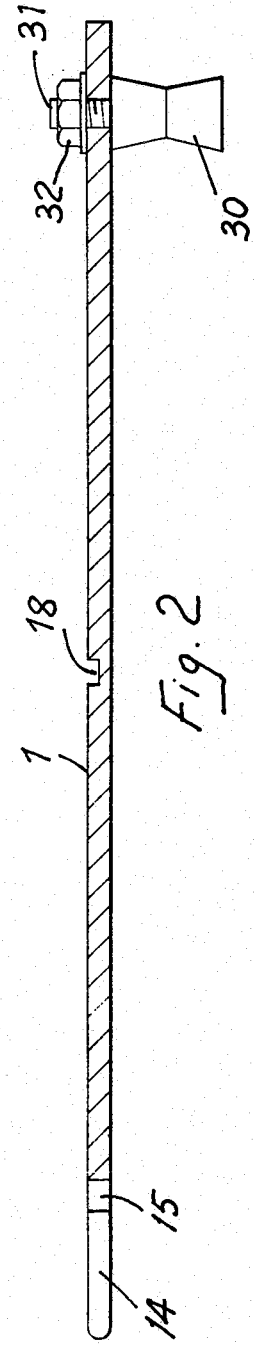
FIG. 2 is a longitudinal section through the basic member shown in FIG. 1, without the saw blades and their anchorages, and with a hammer head fastened towards the middle of the cross-piece or head of the T.

A polygonal, for example square, bore or passage 11 extends transversely through the hatchet part 10, which bore may serve as a spanner or the like. Transverse through the central part of the head, substantially in line with the longtidinal axis of the shank 1 is bored an opening 16 through which the bolt-like shank 31 of a hammer head 30 (FIG. 2) may be inserted, its screw-threaded end projecting from the passage 16 being locked by means of a nut 37. Substantially parallel to, but offset from, the longitudinal axis of the shank 1, is a passage 17 (FIG. 3) which is drilled in the body of the pick-axe part 12.

Intermediate the head and free end of the shank 1, are provided mounting means comprising two substantially transversely opening and extending notches 18 and 19 cut in the shank. In either of these notches an anchoring member comprising a strut 24 may be fitted. One end of a metal-saw blade 20, a wood-saw blade 21, or other cutting blade, may be fastened to any eye or boss at the free end of said strut, while the opposite end of either blade 20 or 21 is fastened to the end of anchoring and tensioning means comprising a bolt 22 passing through the passage 17 in the pick-axe part 12, the blade 20 or 21 being tensioned by means of a wing nut 23 screwed on the projection screw-threaded end of the bolt 22.

Instead of, or in addition to, a saw-blade anchored between the pick-axe part 12 and the shank 1 of the T-shaped basic member, another tool part, such as a digging implement in the form of a spade 40, provided with a neck or handle, may be fitted into the free end of the shank 1 as shown in FIGS. 4 to 6. The spade 40 is provided with a hollow neck 41 made of rolled sheet iron, which is so shaped that it will fit into the cutter 13, 14 as clearly shown in FIG. 4.

As an alternative to the spade 40, a gathering implement in the form of a rake may be fastened on the cutter 13, 14 as shown in FIGS. 7 and 8. The rake comprises a rake head 50 provided with a hole 51, and adapted to be fastened by means of a nut 53 onto a screw-threaded bolt 52 projecting from one end of a neck or handle 54. This handle has a box-like extension provided with a transverse hole 55 which is so positioned that when the extension is fitted onto the cutter 13, 14 the hole 55 is aligned with the enlarged opening 15 at the inner end of the cutter. Thus, in this position, the rake handle 54 may be fastened to the end of shank 1 by means of a bolt 56 and nut 57.

In this manner a rake is provided which, when it is operatively assembled, is fastened securely and positively onto one end of the shank 1, whilst when it is inoperative and disassembled from the shank, the rake head 50 may be detached from, and therefore be capable of lying flat on, the remaining parts.

A rake head without prongs or teeth (not shown), consititued by a transverse bar whose edge may optionally be provided with a felt or like strip, like a money-gathering or croupier's rake, may be provided in addition to, or as an alternative to, a conventional rake.

It will be understood that various modifications may be made without departing from the scope of the invention as defined in the appended claims, bearing in mind that a basic, substantially T-shaped member is provided which may itself constitute a multiple-purpose implement, and may at the same time serve as carrier for other implement parts or members. In all cases, the cross-piece of head of the T may serve to carry integral or detachable striking or hitting implements, while the manually held shank of the T may serve as a handle or shaft for an integral or detachable sheet metal cutter or other implement operable by swinging or rocking the shank, and/or or digging implement such as a spade or other implement operable by pushing or rocking the shank, and/or a gathering implement, such as a rake operable by pushing or pulling the shank. Additionally or alternatively, a part of the cross-piece or head may, in combination with strut-anchoring means, serve to hold saw blades or the like.

What I claim is:

1. A combined multi-purpose implement comprising a basic member and complementary implement parts detachably secured thereto, said basic member comprising a substantially T-shaped member including a head and a shank, said head including a hatchet portion and a pick-axe portion at opposite ends thereof, said hatchet portion including a polygonal aperture therein adapted to serve as a spanner and said shank including a cutter device located at the end of said shank opposite said head, said implement parts including a soil working device detachably secured to said cutter device and adapted to be removed from the cutter device when the latter is to be used, and a hammer member detachably secured to a lateral face of said head, said implement further comprising mounting means on said shank, an anchoring member comprising a strut mounted by said mounting means and extending substantially transversely to said shank, anchoring and tensioning means secured to one of said head portions, and a flexible blade tensioned between said strut and said anchoring and tensioning means.

2. A combined multi-purpose implement according to claim 1 wherein said soil working device comprises a digging implement part.

3. A combined multi-purpose implement according to claim 1 wherein said soil working device comprises a gathering implement part.

4. A combined multi-purpose implement according to claim 1, wherein mounting means comprising two notches provided in, and mutually spaced along, the shank, and wherein a said strut is mountable in either notch to accommodate blades of different lengths.

5. A combined multi-purpose implement as claimed in claim 1, wherein said hammer member includes threaded shank which project through an opening in said head, and a nut is screwed onto the projecting end of the threaded shank to retain the hammer member assembled to the basic member.

6. A combined multi-purpose implement according to claim 1, wherein said cutter device comprises a pair of angularly arranged jaws, one of which has a sharpened edge to serve as cutting blade, while the other jaw serves as lever fulcrum, to permit the blade to be swung relative to, and through, a sheet of metal to be cut thereby.

* * * * *